US010663945B2

United States Patent
Kimata et al.

(10) Patent No.: US 10,663,945 B2
(45) Date of Patent: May 26, 2020

(54) NUMERICAL CONTROL DEVICE

(71) Applicant: Mitsubishi Electric Corporation, Tokyo (JP)

(72) Inventors: Toshiaki Kimata, Tokyo (JP); Tomoya Fujita, Tokyo (JP); Toshihiro Azuma, Tokyo (JP); Tatsuya Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/340,385

(22) PCT Filed: Jul. 5, 2018

(86) PCT No.: PCT/JP2018/025474
§ 371 (c)(1),
(2) Date: Apr. 9, 2019

(87) PCT Pub. No.: WO2020/008587
PCT Pub. Date: Jan. 9, 2020

(65) Prior Publication Data
US 2020/0012253 A1 Jan. 9, 2020

(51) Int. Cl.
G05B 19/402 (2006.01)
G05B 13/04 (2006.01)
(Continued)

(52) U.S. Cl.
CPC .......... *G05B 19/402* (2013.01); *B23Q 15/12* (2013.01); *G05B 13/0265* (2013.01);
(Continued)

(58) Field of Classification Search
CPC .............. G05B 13/0265; G05B 13/041; G05B 2219/37077; G05B 19/402; G05B 19/404;
(Continued)

(56) References Cited

U.S. PATENT DOCUMENTS 4,277,880 A * 7/1981 Utsumi ................ B23Q 35/102
409/99
4,596,066 A * 6/1986 Inoue ...................... B23H 1/04
483/4
(Continued)

FOREIGN PATENT DOCUMENTS

JP 4-340105 A 11/1992
JP 6-113579 A 4/1994
(Continued)

OTHER PUBLICATIONS

International Search Report and Written Opinion of the International Searching Authority dated Oct. 2, 2018 for PCT/JP2018/025474 filed on Jul. 5, 2018, 10 pages including English Translations.

*Primary Examiner* — Crystal J Barnes-Bullock
(74) *Attorney, Agent, or Firm* — Xsensus LLP

(57) ABSTRACT

A numerical control device includes: a tool-side displacement measurement unit; a workpiece-side displacement measurement unit; a drive signal measurement unit; a relative displacement calculation unit between the tool and the workpiece; a relative displacement prediction unit calculating a relative displacement predicted value from the drive signal, from a prediction model representing a relationship between the drive signal and the relative displacement; a model parameter operation unit generating prediction model parameters constituting the prediction model, from the drive signal, the relative displacement, and the predicted value; and a command value correction unit outputting a post-correction position command obtained by correcting a position command to the drive unit using the prediction model parameters. The model parameter operation unit changes the prediction model parameters to reduce a difference between the relative displacement and the predicted value.

16 Claims, 11 Drawing Sheets

(51) Int. Cl.
*G05B 13/02* (2006.01)
*G05B 19/404* (2006.01)
*B23Q 15/12* (2006.01)

(52) U.S. Cl.
CPC ......... *G05B 13/041* (2013.01); *G05B 13/048* (2013.01); *G05B 19/404* (2013.01); *G05B 2219/37077* (2013.01); *G05B 2219/37436* (2013.01); *G05B 2219/41154* (2013.01); *G05B 2219/42044* (2013.01); *Y02P 90/26* (2015.11); *Y10T 483/13* (2015.01); *Y10T 483/14* (2015.01); *Y10T 483/15* (2015.01); *Y10T 483/17* (2015.01)

(58) Field of Classification Search
CPC ........... G05B 2219/41154; G05B 2219/42044; B23Q 15/12; Y02P 90/26; Y10T 483/13; Y10T 483/14; Y10T 483/15; Y10T 483/17
See application file for complete search history.

(56) References Cited

U.S. PATENT DOCUMENTS

| | | | | |
|---|---|---|---|---|
| 5,341,079 A * | 8/1994 | Matsuura | ............. | B23Q 35/121 318/632 |
| 5,432,422 A | 7/1995 | Nagano et al. | | |
| 5,523,953 A * | 6/1996 | Araie | ................... | G05B 19/404 700/193 |
| 5,619,414 A * | 4/1997 | Ishii | ..................... | G05B 19/404 318/565 |
| 5,779,405 A * | 7/1998 | Aiso | ....................... | B23Q 5/32 408/13 |
| 7,082,349 B2 * | 7/2006 | Kawai | .................. | B23Q 35/127 700/161 |
| 7,205,743 B2 | 4/2007 | Iwashita et al. | | |
| 8,093,856 B2 * | 1/2012 | Miyaji | ................. | G05B 19/404 318/632 |
| 8,682,456 B2 * | 3/2014 | Kimura | ................... | B23Q 15/06 409/80 |
| 9,317,029 B2 * | 4/2016 | Morfino | ............. | G05B 19/4069 |
| 10,108,177 B2 * | 10/2018 | Fujita | ..................... | G05B 11/32 |
| 2009/0222109 A1 | 9/2009 | Takagi | | |
| 2019/0163161 A1 * | 5/2019 | Sonoda | ................ | G05B 19/402 |
| 2019/0302729 A1 * | 10/2019 | Azuma | ................ | G05B 19/404 |

FOREIGN PATENT DOCUMENTS

| | | | |
|---|---|---|---|
| JP | 3304484 B2 * | 7/2002 | |
| JP | 2006-198742 A | 8/2006 | |
| JP | 4283214 B2 | 6/2009 | |
| JP | 2009-205641 A | 9/2009 | |
| JP | 6180688 B1 | 8/2017 | |
| WO | 2018/105085 A1 | 6/2018 | |

* cited by examiner

NUMERICAL CONTROL DEVICE

CROSS-REFERENCE TO RELATED APPLICATION

The present application is based on PCT filing PCT/JP2018/025474, filed Jul. 5, 2018, which is incorporated herein by reference.

FIELD

The present invention relates to a numerical control device for controlling a machine tool in accordance with a machining program.

BACKGROUND

When a machine tool performs machining, a driving force of a movable body may sometimes cause a relative displacement between the movable body and a non-movable body to be vibrational, thereby degrading machining accuracy and quality. To this problem, Patent Literature 1 proposes a technique in which a numerical control device predicts a relative displacement using a prediction model created in advance for predicting the relative displacement, and performs feedforward correction based on the predicted relative displacement. This technique can be used even when a drive direction is different from a vibration direction.

CITATION LIST

Patent Literature

Patent Literature 1: Japanese Patent No. 6180688

SUMMARY

Technical Problem

However, in actual machining, the relative displacement between the tool and the workpiece changes due to a change in the inertia of the machine tool such as a change in the weight of the workpiece mounted or a change in the positional relationship between the tool and the workpiece. In the technique described in Patent Literature 1, a change in the inertia of the machine tool is not taken into consideration. Thus, when the inertia of the machine tool has changed, a proper correction cannot be made on a command from the numerical control device.

The present invention has been made in view of the above circumstances, and its object is to provide a numerical control device capable of suppressing the occurrence of vibration in a relative displacement between a tool and a workpiece when the inertia of a machine tool has changed.

Solution to Problem

In order to solve the above-described problem and achieve the object, the present invention provides a numerical control device for controlling a relative displacement between a tool and a workpiece in a machine tool using a command to a drive unit driving a motor, the numerical control device comprising: a tool-side displacement measurement unit to measure a physical quantity related to a displacement of the tool; a workpiece-side displacement measurement unit to measure a physical quantity related to a displacement of the workpiece; a drive signal measurement unit to measure a drive signal outputted from the drive unit to the motor; a relative displacement calculation unit to calculate a relative displacement between the tool and the workpiece from the physical quantity related to the displacement of the tool and the physical quantity related to the displacement of the workpiece; and a relative displacement prediction unit to calculate a relative displacement predicted value that is a predicted value of the relative displacement from the drive signal, based on a prediction model representing a relationship between the drive signal and the relative displacement. The numerical control device of the present invention further comprises: a model parameter operation unit to generate prediction model parameters constituting the prediction model, based on the drive signal, the relative displacement generated by the relative displacement calculation unit, and the relative displacement predicted value; and a command value correction unit to output as the command a post-correction position command obtained by correcting a position command to the drive unit using the prediction model parameters. The model parameter operation unit changes the prediction model parameters to reduce a difference between the relative displacement generated by the relative displacement calculation unit and the relative displacement predicted value.

Advantageous Effects of Invention

The numerical control device according to the present invention has an advantageous effect of being able to suppress the occurrence of vibration in a relative displacement between the tool and the workpiece when the inertia of the machine tool has changed.

DESCRIPTION OF EMBODIMENTS

Hereinafter, a numerical control device according to embodiments of the present invention will be described in detail with reference to the drawings. Note that the invention is not necessarily limited by these embodiments.

First Embodiment

Figure 1:
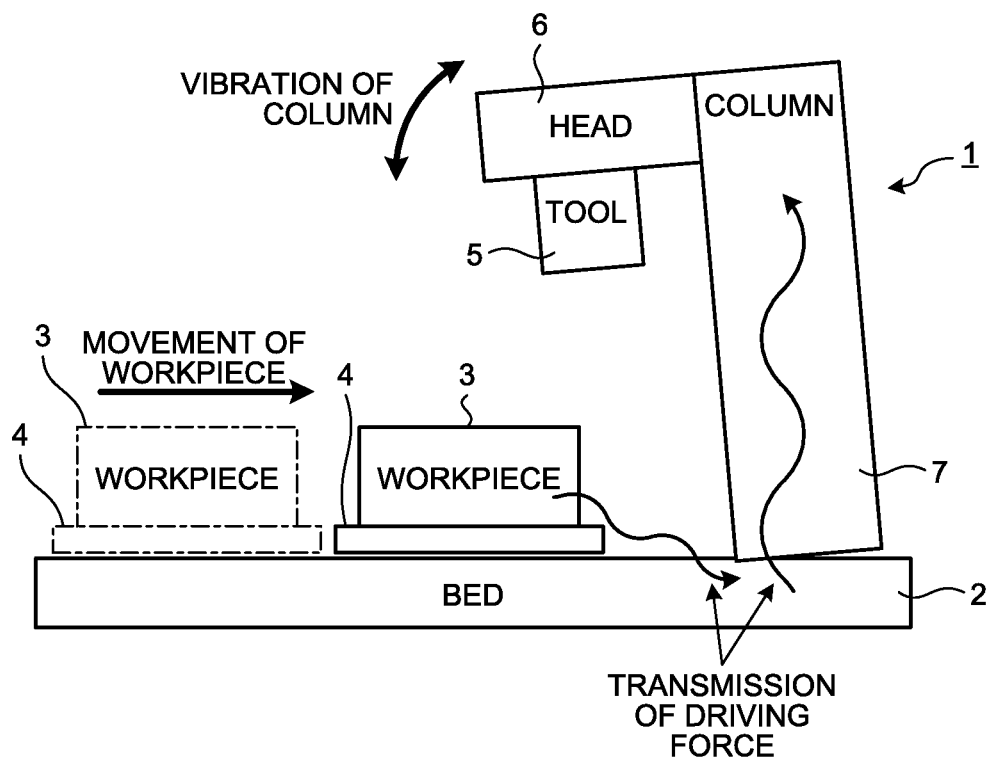
FIG. 1 is a diagram schematically illustrating an example of a configuration of a machine tool according to a first embodiment of the present invention.
Figure 2:
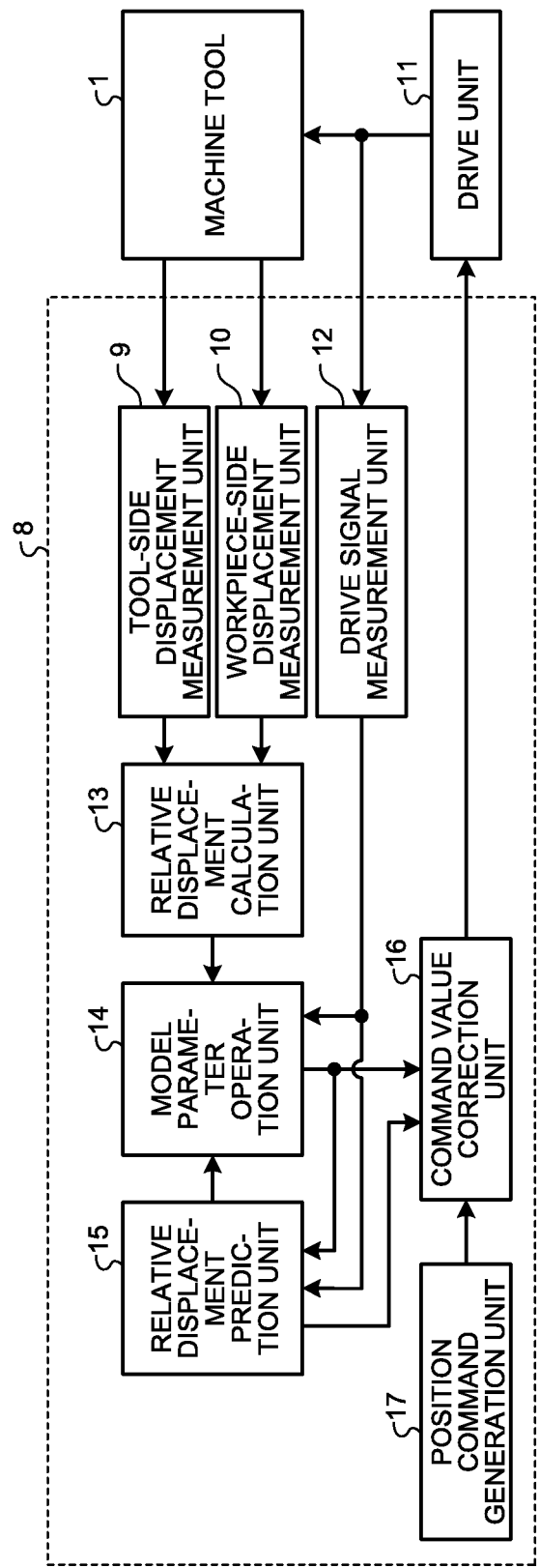
FIG. 2 is a block diagram illustrating an example of a functional configuration of a numerical control device according to the first embodiment.

FIG. 1 is a diagram schematically illustrating an example of a configuration of a machine tool 1 according to a first embodiment of the present invention. FIG. 2 is a block diagram illustrating an example of a functional configuration of a numerical control device 8 according to the first embodiment. In FIG. 1, the numerical control device 8 and a drive unit 11 connected to the machine tool 1 are not illustrated.

The machine tool 1 includes a bed 2 serving as a base, a table 4 that is movable in a horizontal direction and is rotatable in a horizontal plane while holding a workpiece 3 to be machined, a head 6 movable in a vertical direction while holding a tool 5, and a column 7 that is fixed on the bed 2 and supports the head 6.

The numerical control device 8 is connected to the machine tool 1 and the drive unit 11 that drives a motor of the machine tool 1, with controlling the position and speed of the motor. The numerical control device 8 is a device that outputs movement commands to the drive unit 11, according to a machining program for machining the workpiece 3. According to an instruction from the numerical control device 8, in the machine tool 1, the table 4 moves in a horizontal direction or rotates in the horizontal plane, or the head 6 moves in a vertical direction, whereby the workpiece 3 is machined into an intended shape by the tool 5. In the machine tool 1, a driving force to move the table 4 propagates as a reaction force, thereby generating vibration in structures other than the workpiece 3. The structures in which vibration is generated include the column 7. When such vibration occurs, the relative position of the tool 5 with respect to the workpiece 3 vibrates.

The following describes the operation of the numerical control device 8 to prevent degradation of machining accuracy or work surface quality when vibration as described above has occurred.

The drive unit 11 generates a drive signal for moving the table 4 or the head 6, according to a movement command from the numerical control device 8, and outputs the generated drive signal to the motor of the machine tool 1. According to the drive signal, the motor mounted to the machine tool 1 is driven, thereby translationally driving or rotationally driving the table 4 or the head 6. As a result, the relative displacement between the tool 5 and the workpiece 3 in the machine tool 1 is controlled. The first embodiment describes a case where the table 4 is moved. In the description here, an object driven like the table 4 is referred to as a driven object, and an object not driven like the head 6 as a non-driven object.

The numerical control device 8 includes a tool-side displacement measurement unit 9, a workpiece-side displacement measurement unit 10, a drive signal measurement unit 12, a relative displacement calculation unit 13, a model parameter operation unit 14, a relative displacement prediction unit 15, a command value correction unit 16, and a position command generation unit 17.

The tool-side displacement measurement unit 9 acquires a physical quantity related to the displacement of the tool 5 from a sensor attached to the head 6 or the tool 5, and outputs the quantity to the relative displacement calculation unit 13. The displacement of the tool 5 means the amount of change in the position of the tool 5. The sensor may be any sensor capable of acquiring a physical quantity related to the displacement of the tool 5, such as an acceleration sensor, a speed sensor, or a displacement sensor.

The workpiece-side displacement measurement unit 10 acquires a physical quantity related to the displacement of the workpiece 3 from a sensor attached to the workpiece 3, the table 4, or the bed 2, and outputs the quantity to the relative displacement calculation unit 13. The displacement of the workpiece 3 means the amount of change in the position of the workpiece 3. The sensor may be any sensor capable of acquiring a physical quantity related to the displacement of the workpiece 3, such as an acceleration sensor, a speed sensor, or a displacement sensor.

The drive signal measurement unit 12 acquires a drive signal outputted from the drive unit 11, and outputs the drive signal to the relative displacement prediction unit 15 and the model parameter operation unit 14.

The relative displacement calculation unit 13 calculates the relative displacement between the tool 5 and the workpiece 3 from the physical quantity related to the displacement of the tool 5 acquired from the tool-side displacement measurement unit 9 and the physical quantity related to the displacement of the workpiece 3 acquired from the workpiece-side displacement measurement unit 10. The relative displacement between the tool 5 and the workpiece 3 means the amount of change in the position of the tool 5 with respect the position of the workpiece 3 or the amount of change in the position of the workpiece 3 with respect to the position of the tool 5, or a difference between the displacement of the tool 5 and the displacement of the workpiece 3. As a generation procedure, first, the difference between the physical quantity related to the displacement acquired from the tool-side displacement measurement unit 9 and the physical quantity related to the displacement acquired from the workpiece-side displacement measurement unit 10 is taken to obtain difference information on displacement. When the difference information corresponds to data in a dimension of acceleration, a relative displacement is calculated by performing second-order integration of the data with respect to time. When the difference information corresponds to data in a dimension of velocity, a relative displacement is calculated by performing first-order integration of the data with respect to time. When the difference information corresponds to data in a dimension of position, the data is generated as a relative displacement without performing integration operation on the data. The relative displacement generated by the relative displacement calculation unit 13 is outputted to the model parameter operation unit 14.

The model parameter operation unit 14 computes and generates a prediction model parameter based on the relative displacement acquired from the relative displacement calculation unit 13, the drive signal acquired from the drive signal measurement unit 12, and a relative displacement predicted value acquired from the relative displacement prediction unit 15 described later. A prediction model is a model expressed by a relational expression representing a correlation with the drive signal as an input and with the relative displacement in a three-dimensional space between the workpiece 3 and the tool 5 as an output. Parameters constituting the prediction model are referred to as prediction model parameters. A method of generating a prediction model parameter differs in processing procedure between before a machining operation and during a machining operation, details of which will be described later. The prediction model parameter determined by computation of the model parameter operation unit 14 is outputted to the relative displacement prediction unit 15 and the command value correction unit 16.

The relative displacement prediction unit 15 constructs a prediction model using the prediction model parameters acquired from the model parameter operation unit 14. Based on the constructed prediction model, the relative displacement prediction unit 15 calculates the relative displacement predicted value, which is a predicted value of the relative displacement, from the drive signal acquired from the drive signal measurement unit 12.

The position command generation unit 17 reads a machining program for machining the workpiece 3, and outputs a position command as a movement command for the drive unit 11 to the command value correction unit 16.

The command value correction unit 16 corrects the position command in a method described later, the position command being acquired from the position command generation unit 17, and determines a post-correction position command to cause the drive unit 11 to drive the machine tool 1 so that the relative displacement does not vibrate to output the post-correction position command to the drive unit 11.

Generation processing procedures of prediction model parameters before a machining operation and during a machining operation in the model parameter operation unit 14 will be described individually.

First, a generation processing procedure of prediction model parameters before a machining operation will be described. Before a machining operation, the drive unit 11 is caused to output a drive signal for vibrating the machine tool 1. The model parameter operation unit 14 acquires the drive signal at that time from the drive signal measurement unit 12, and the model parameter operation unit 14 acquires a relative displacement at that time from the relative displacement calculation unit 13. From the acquired drive signal and relative displacement, the model parameter operation unit 14 derives parameters of a prediction model that is a state space model capable of expressing the relationship between the drive signal and vibration generated in the relative displacement, that is, prediction model parameters. Here, the model parameter operation unit 14 derives the prediction model parameters, using a model obtained by a simulation based on the finite element method or a kinetic model, a model obtained by system identification, or a model approximated by order reduction or the like from a model obtained by system identification. However, the method of deriving the parameters of the prediction model is not necessarily limited to these methods. In this example, parameters of a prediction model of state-space representation are derived based on a model approximated by order reduction or the like from a model obtained by the system identification.

Figure 3:
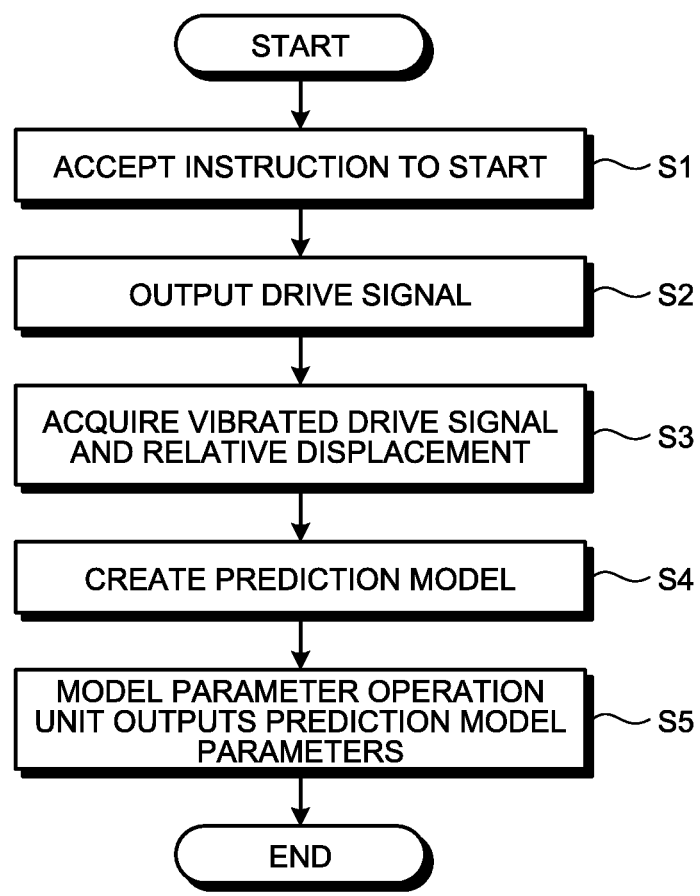
FIG. 3 is a flowchart illustrating an example of a generation processing procedure of prediction model parameters before a machining operation according to the first embodiment.

FIG. 3 is a flowchart illustrating an example of a generation processing procedure of prediction model parameters before a machining operation according to the first embodiment. First, for a preliminary preparation for the generation processing procedure of prediction model parameters before a machining operation, sensors are attached to both the tool side and the workpiece side. Specifically, a sensor is attached to the head 6 or the tool 5 in order for the tool-side displacement measurement unit 9 to be able to acquire tool-side displacement information. Further, a sensor is attached to the workpiece 3, the table 4, or the bed 2 in order for the workpiece-side displacement measurement unit 10 to be able to acquire workpiece-side displacement information.

When the above preliminary preparation is completed, the user instructs the start of the generation processing of prediction model parameters, and an input device of the numerical control device 8 receives the instruction to start the generation processing of prediction model parameters (step S1).

Next, the drive unit 11 outputs a drive signal for vibrating the machine tool 1 (step S2). The drive signal is a vibration signal different from a signal used when actual machining is performed. The vibration signal may be any signal having a frequency band including the vibration frequency of vibration of a relative displacement generated between the tool 5 and the workpiece 3, for which a pseudorandom signal, a sine sweep signal, or the like is used.

Then, the model parameter operation unit 14 acquires the drive signal currently subjected to vibration from the drive signal measurement unit 12, and acquires a relative displacement at that time from the relative displacement calculation unit 13 (step S3).

The model parameter operation unit 14 produces a prediction model from the acquired drive signal and relative displacement using a system identification method. The model parameter operation unit 14 performs approximation by order reduction or the like on the produced prediction model, thereby producing a prediction model simulating vibration of the relative displacement that affects machining accuracy and quality (step S4). To produce a prediction model specifically means to determine prediction model parameters that are parameters representing the prediction model.

The model parameter operation unit 14 outputs the prediction model parameters constituting the prediction model produced in step S4 to the relative displacement prediction unit 15 and the command value correction unit 16 (step S5). In this example, those in the state-space representation of the produced prediction model are used as the prediction model parameters. However, the prediction model parameters are not necessarily limited to those in the state-space representation.

The command value correction unit 16 acquires a position command from the position command generation unit 17, acquires a relative displacement predicted value from the relative displacement prediction unit 15, and acquires prediction model parameters from the model parameter operation unit 14. Based on the acquired position command, relative displacement predicted value, and prediction model parameters, the command value correction unit 16 outputs a post-correction position command to cause the drive unit 11 to drive the machine tool 1 so that the relative displacement does not vibrate with respect to the position command.

A method of generating the post-correction position command in the command value correction unit 16 is as follows as described in Patent Literature 1. Specifically, the command value correction unit 16 predicts a relative displacement that is the amount of movement of the non-driven object, based on the prediction model constructed using the prediction model parameters acquired from the model parameter operation unit 14, and predicts the amount of movement of the driven object based on a predetermined model for predicting the amount of movement of the driven object. Then, the command value correction unit 16 calculates a feedback gain by the design of an optimum regulator, and calculates the amount of correction to the position command to reduce the amount of movement of the non-driven object, using the predicted amounts of movement of the non-driven object and the driven object and information including the feedback gain. The command value correction unit 16 outputs a post-correction position command obtained by correcting the position command with the calculated amount of correction as a command to the drive unit 11. However, the correction method in the command value correction unit 16 is not limited to this manner. The frequency of vibration of a relative displacement may be determined from a prediction model, and such a filter as to suppress vibration of that frequency may be set in the command value correction unit 16. By the correction of the position command as described above, it is possible to suppress vibration generated in the relative displacement between the tool 5 and the workpiece 3 when the table 4 is moved.

However, when the weight or the shape of the workpiece 3, a jig, a vise, a measuring instrument, the tool 5, or the like greatly changes, when the positional relationship between the tool 5 and the workpiece 3 greatly changes as a result of a translational drive or a rotational drive, or when an environmental change, degradation over time, or the like occurs, the inertia of the machine tool 1 changes. When the inertia of the machine tool 1 changes, the vibration characteristics of the relative displacement changes, so that it becomes difficult to correctly predict the relative displacement by the prediction model produced by the above-described method. As a result, the relative displacement can become vibrational.

Therefore, when the inertia of the machine tool 1 has changed, the numerical control device 8 according to the first embodiment executes prediction model parameter change processing for changing a prediction model parameter. The prediction model parameter change processing is performed by the model parameter operation unit 14 during a machining operation. The following describes the prediction model parameter change processing.

During a machining operation, the model parameter operation unit 14 determines a time when acceleration is ended or a time when deceleration is ended from a drive signal acquired from the drive signal measurement unit 12. Then, the model parameter operation unit 14 acquires from the relative displacement calculation unit 13 a relative displacement for an arbitrary period of time from the time when acceleration is ended or the time when deceleration is ended. The model parameter operation unit 14 acquires a relative displacement predicted value from the relative displacement prediction unit 15. Then, the model parameter operation unit 14 calculates the absolute value of a difference between the acquired relative displacement predicted value and the acquired relative displacement. This absolute value is regarded as a prediction error of relative displacement.

When the inertia of the machine tool 1 has not greatly changed at the time of vibration before the machining operation, the prediction error of relative displacement has a very small value near zero because the vibration of the relative displacement is suppressed by a post-correction position command. However, when the inertia of the machine tool 1 has greatly changed, the prediction error of relative displacement becomes vibrational, and so vibration at that time is predicted. Specifically, when the prediction error of relative displacement becomes larger than a threshold value, the model parameter operation unit 14 calculates the vibration frequency, the amplitude, the damping ratio, and the phase of vibration of the relative displacement acquired from the relative displacement calculation unit 13, using an optimization method. The threshold value is set to a predetermined proper positive value so that optimization is performed only when necessary. If the accuracy of the prediction model at the time of vibration is sufficiently good, the relative displacement predicted value has sufficiently reduced vibration. Therefore, the relative displacement predicted value is assumed to be zero here, and the vibration of the relative displacement is calculated by the optimization method. In this example, the description is made using particle swarm optimization (PSO) that is a publicly known method as an optimization method, but the optimization method for determining the vibration of a relative displacement is not necessarily limited to this method.

An optimization formula in particle swarm optimization is expressed by numerical formulas (1) and (2) below.

[Formula 1]

$$v_i^{k+1} = w \cdot v_i^k + c_1 \cdot \text{rand}_{1i} \cdot (p\text{best}_i^k - x_i^k) + c_2 \cdot \text{rand}_{2i} \cdot (g\text{best} - x_i^k) \quad (1)$$

[Formula 2]

$$x_i^{k+1} = x_i^k + v_i^{k+1} \quad (2)$$

A subscript i in numerical formulas (1) and (2) represents a particle number (the number of particles), a superscript k represents a search number, w, $c_1$, and $c_2$ represent weighting factors in their respective terms, $\text{rand}_{1i}$ and $\text{rand}_{2i}$ represent uniform random numbers from 0 to 1, $x_i^k$ represents a position vector at the current search number k of the i-th particle, $v_i^k$ represents a movement vector at the current search number k of the i-th particle, $x_i^{k+1}$ represents a position vector at the next search number k+1 of the i-th particle, $v_i^{k+1}$ represents a movement vector at the next search number k+1 of the i-th particle, $p\text{best}_i$ represents the past best solution of the i-th particle, and $g\text{best}$ represents the past best solution of all particles.

The vibration of a relative displacement acquired by the model parameter operation unit 14 from the relative displacement calculation unit 13 is assumed to be able to be estimated as in the following numerical formula (3).

[Formula 3]

$$y = A \cdot \exp(-2 \cdot \pi \cdot f \cdot \zeta) \cdot \sin(2 \cdot \pi \cdot f \cdot t + \Phi) \quad (3)$$

In numerical formula (3), y represents an estimated relative displacement, A represents an amplitude, f represents a vibration frequency, $\zeta$ represents a damping ratio, $\phi$ represents a phase, and t represents an amount of time from an acceleration ending or a deceleration ending. At this time, with setting a position vector $x_i^k = [A, f, \zeta, \phi]$, an amplitude, a vibration frequency, a damping ratio, and a phase are obtained such that the absolute value of the difference between the relative displacement y estimated by numerical formula (3) and the relative displacement acquired from the relative displacement calculation unit 13 is minimized.

Figure 4:
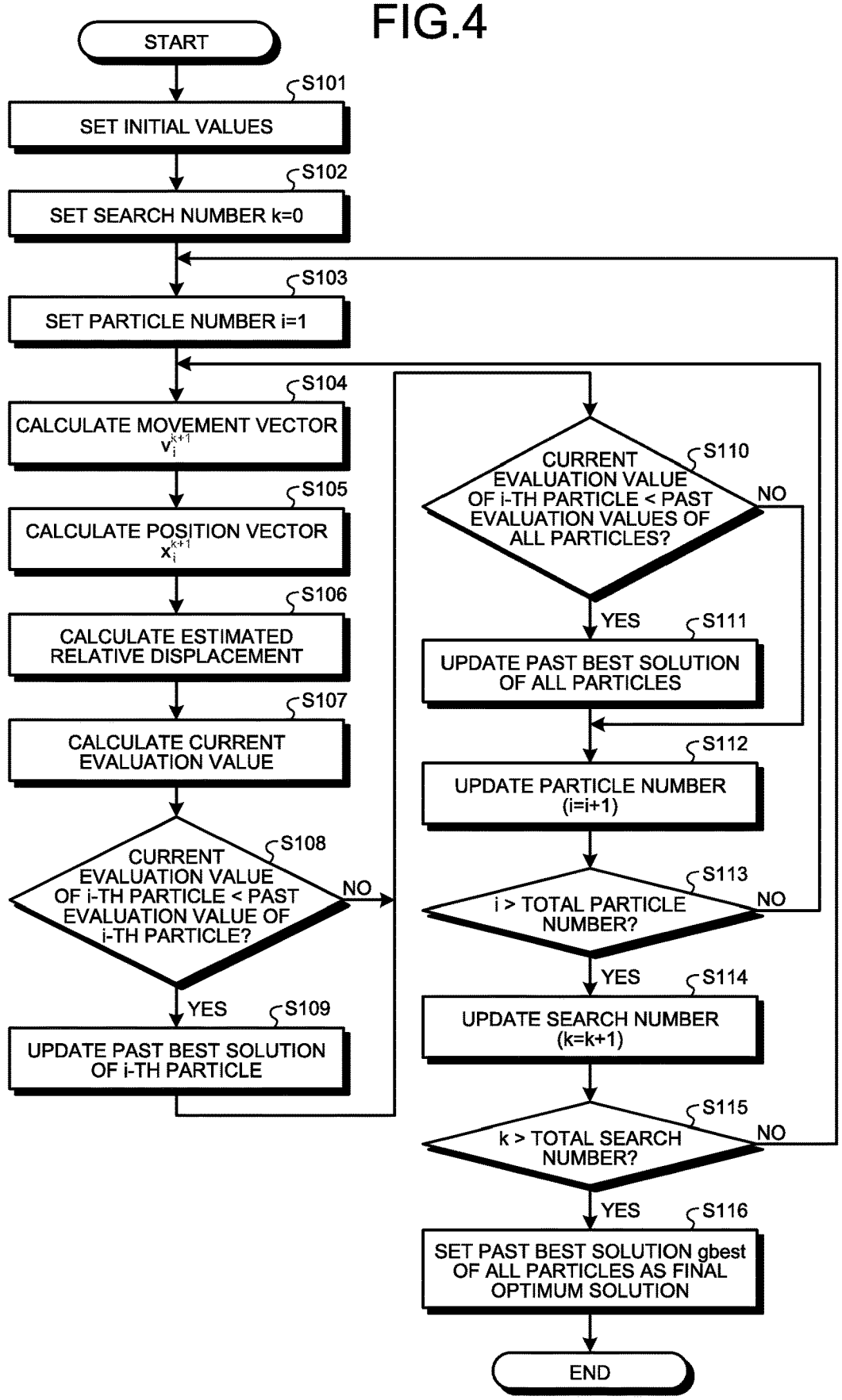
FIG. 4 is a flowchart illustrating an example of a procedure for calculating an optimal solution using particle swarm optimization according to the first embodiment.

FIG. 4 is a flowchart illustrating an example of a procedure for calculating an optimal solution using particle swarm optimization according to the first embodiment. Each step in the flowchart of FIG. 4 is executed by the model parameter operation unit 14.

First, the model parameter operation unit 14 sets initial values in particle swarm optimization (step S101). Specifically, what are properly set are a maximum value of the particle number i which is the total number of particles, a maximum value of the search number k which is the total search number, the weighting factors w, $c_1$, and $c_2$, an initial value $x_i^0$ of the position vector of each particle, an initial value $v_i^0$ of the movement vector of each particle, an initial value $pbest_i^0$ of the past best solution of the i-th particle, and an initial value of the past best solution gbest of all the particles.

Next, search number k=0 is set (step S102).

Next, particle number i=1 is set (step S103).

Next, according to numerical formula (1), the movement vector $v_i^{k+1}$ at the next search number k+1 is calculated (step S104).

Next, according to numerical formula (2), the position vector $x_i^{k+1}$ at the next search number k+1 is calculated (step S105).

Next, using the position vector $x_i^{k+1}$ determined in step S105, the relative displacement y estimated by numerical formula (3) is calculated as $y_i$ (step S106).

Next, the current evaluation value $Y_i^{k+1}=|y_i-y_{ref}|$ of the i-th particle is calculated (step S107), the evaluation value being the absolute value of the difference between the relative displacement $y_i$ estimated in step S106 and the relative displacement $y_{ref}$ acquired from the relative displacement calculation unit 13.

It is determined whether or not the current evaluation value of the i-th particle calculated in step S107 is smaller than an evaluation value obtained in the past for the i-th particle (step S108). When it is determined that the current evaluation value is smaller than the past evaluation value (step S108: Yes), the process proceeds to step S109. Otherwise (step S108: No), the process proceeds to step S110.

By setting the position vector $x_i^{k+1}$ determined in step S105 as the past best solution $pbest_i$ of the i-th particle, the past best solution $pbest_i$ of the i-th particle is updated (step S109). That is, $pbest_i=x_i^{k+1}$ is set.

It is determined whether or not the current evaluation value of the i-th particle calculated in step S107 is smaller than evaluation values obtained in the past for all the particles (step S110). When it is determined that the current evaluation value is smaller than the past evaluation values of all the particles (step S110: Yes), the process proceeds to step S111. Otherwise (step S110: No), the process proceeds to step S112.

By setting the past best solution $pbest_i$ of the i-th particle as the past best solution gbest of all the particles, the past best solution gbest of all the particles is updated (step S111). That is, gbest=$pbest_i$ is set.

The particle number i is incremented by one, with i=i+1, to be updated (step S112).

Next, it is determined whether or not the particle number i is larger than the total particle number set in step S101 (step S113). When it is determined that the particle number i is larger than the total particle number set in step S101 (step S113: Yes), the process proceeds to step S114. Otherwise (step S113: No), the process proceeds to step S104.

The search number k is incremented by one, with k=k+1, to be updated (step S114).

Next, it is determined whether or not the search number k is larger than the total search number set in step S101 (step S115). When it is determined that the search number k is larger than the total search number set in step S101 (step S115: Yes), the process proceeds to step S116. Otherwise (step S115: No), the process proceeds to step S103.

The past best solution gbest of all the particles is set as the final optimal solution (step S116). It is determined that this best solution gbest corresponds to the vibration frequency, the amplitude, the damping ratio, and the phase of vibration of the relative displacement acquired from the relative displacement calculation unit 13.

The model parameter operation unit 14 changes the prediction model by applying the vibration frequency and others determined as described above to portions of the prediction model corresponding to the vibration frequency and others.

Here, it is assumed that the prediction model is concretely expressed by a transfer function as in numerical formula (4) below.

[Formula 4]

$$G(s) = \frac{N(s)}{(s-\lambda)(s-\lambda^\sim)} \quad (4)$$

In numerical formula (4), s represents a Laplace operator, N(s) represents a polynomial of s, $\lambda$ represents an eigenvalue of the prediction model, and $\lambda^\sim$ represents a conjugate complex number of $\lambda$. In general, a real part $\lambda_{real}$ and an imaginary part $\lambda_{imag}$ of the eigenvalue A can be expressed as in numerical formulas (5) and (6) below using the vibration frequency f and the damping ratio $\zeta$.

[Formula 5]

$$\lambda_{real}=\zeta \cdot (2\cdot\pi\cdot f) \quad (5)$$

[Formula 6]

$$\lambda_{imag}=\sqrt{1-\zeta^2}\cdot(2\cdot\pi\cdot f) \quad (6)$$

By substituting the vibration frequency f and the damping ratio $\zeta$ determined in step S116 of the above-described optimization method into the vibration frequency f and the damping ratio $\zeta$ of numerical formulas (5) and (6), the eigenvalue is changed, and the model parameter operation unit 14 can change the prediction model to a model adapted to the vibration of the relative displacement acquired from the relative displacement calculation unit 13. By the state-space representation of the changed prediction model, the prediction model parameters can also be changed. Since the relative displacement calculation unit 13 calculates the relative displacement from the physical quantities related to the displacement acquired from the tool-side displacement measurement unit 9 and the workpiece-side displacement measurement unit 10, the prediction model parameters can be changed according to a change in the inertia of the machine tool 1. When the prediction model parameter is changed by the model parameter operation unit 14 as described above, the prediction model parameters used by the relative displacement prediction unit 15 are changed. Thereby, a difference between a relative displacement predicted value outputted by the relative displacement prediction unit 15 based on a drive signal using the prediction model parameters and a relative displacement generated by the relative displacement calculation unit 13 is minimized to be zero. More specifically, the model parameter operation unit 14 changes the prediction model parameters so that the vibration frequency, the amplitude, the damping ratio, and the phase of vibration of a relative displacement predicted value predicted by the relative displacement prediction unit 15 correspond to the vibration frequency, the amplitude, the damping ratio, and the phase of vibration of a relative displacement generated by the relative displacement calculation unit 13, respectively.

Figure 5:
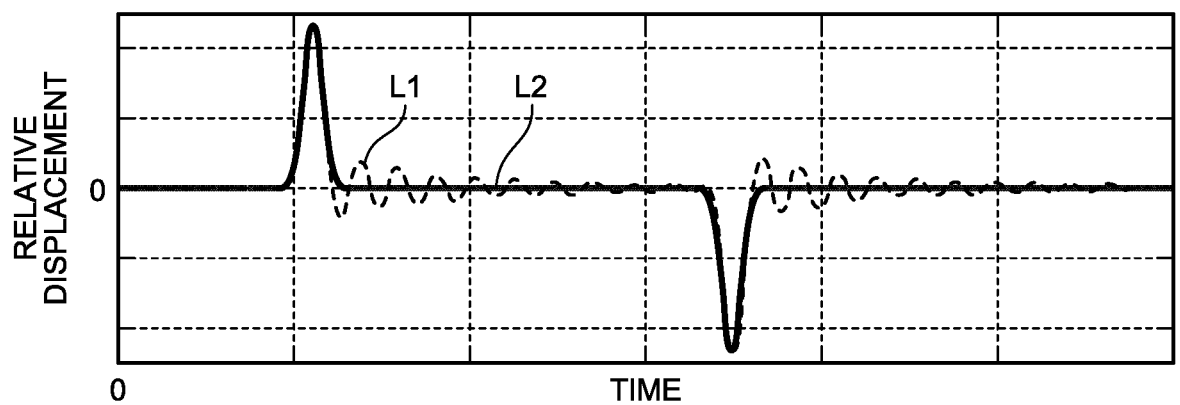
FIG. 5 is a graph illustrating an effect due to changing prediction model parameters according to the first embodiment.

FIG. 5 is a graph illustrating the effect of changing the prediction model parameters according to the first embodiment. FIG. 5 is a graph illustrating an example of simulation results on the relative displacement in the vertical direction of the tool 5 with respect to the workpiece 3 when the workpiece 3 is moved in the horizontal direction in the machine tool 1 as illustrated in FIG. 1.

In FIG. 5, the horizontal axis represents time, and the vertical axis represents relative displacement. A curve L1 indicated by a broken line in FIG. 5 represents change over time of the relative displacement in the vertical direction when only a prediction model constructed before a machining operation is used without making a change of the prediction model during the machining operation. A curve L2 indicated by a solid line in FIG. 5 represents change over time of the relative displacement in the vertical direction when the prediction model is changed during the machining operation as described above. The prediction model was subjected to simulation using numerical expression (4) for the prediction model. When the prediction model is not changed during the machining operation, vibrated amplitude in the vertical direction occurs as shown by the curve L1 as a result of a change in the vibration frequency of vibration of the relative displacement caused by a change in the inertia of the machine tool 1 during operation. On the other hand, when the prediction model is changed during the machining operation, as shown by the curve L2, it is understood that vibrated amplitude in the vertical direction is sufficiently reduced, and the vibration ending time is shortened as compared with the curve L1.

As described above, according to the numerical control device 8 of the first embodiment, a prediction model is optimized, that is, prediction model parameters are optimized, based on a relative displacement measured during a machining operation. This allows inhibition of occurrence of vibration in a relative displacement between the tool and the workpiece when the inertia of the machine tool 1 during a machining operation has changed.

Second Embodiment

Figure 6:
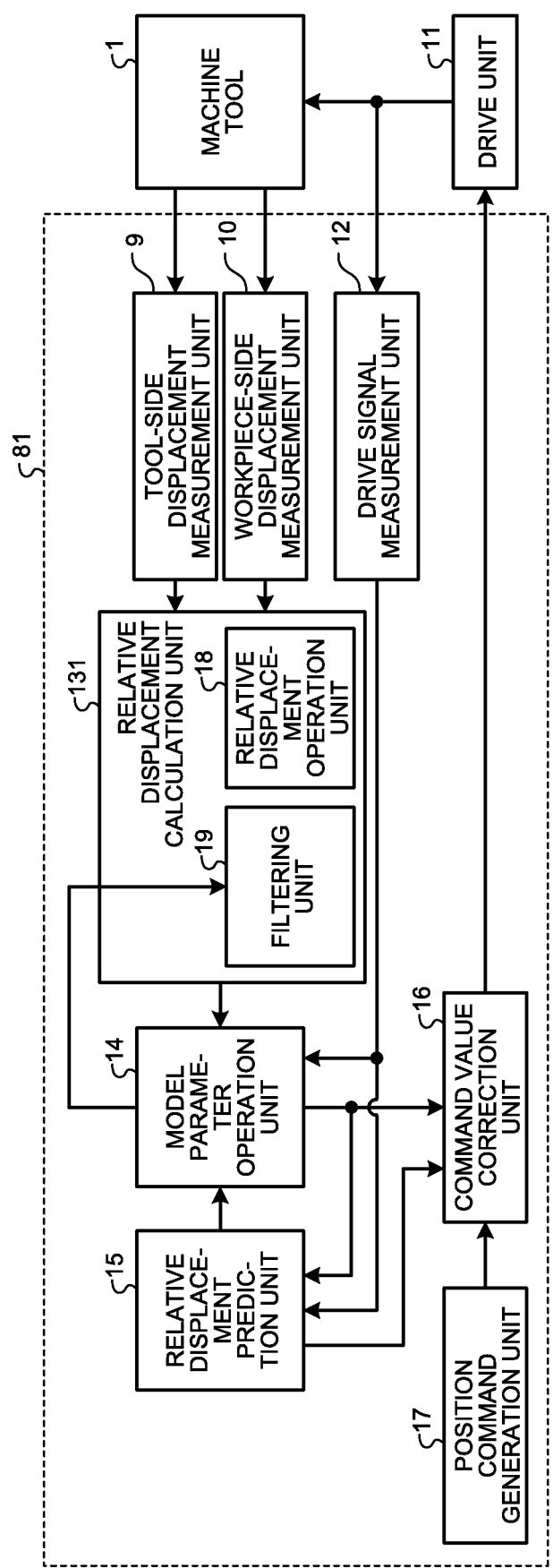
FIG. 6 is a block diagram illustrating an example of a functional configuration of a numerical control device according to a second embodiment of the present invention.

FIG. 6 is a block diagram illustrating an example of a functional configuration of a numerical control device 81 according to a second embodiment of the present invention. The numerical control device 81 is different from the numerical control device 8 according to the first embodiment in that the relative displacement calculation unit 13 is changed to a relative displacement calculation unit 131.

The relative displacement calculation unit 131 includes a relative displacement operation unit 18 and a filtering unit 19. The relative displacement operation unit 18 performs the same processing as the relative displacement calculation unit 13 according to the first embodiment. In the second embodiment, a relative displacement between the tool and the workpiece, which is outputted from the relative displacement operation unit 18 is defined as a pre-filtering relative displacement. The pre-filtering relative displacement outputted from the relative displacement operation unit 18 is inputted to the filtering unit 19.

Figure 7:
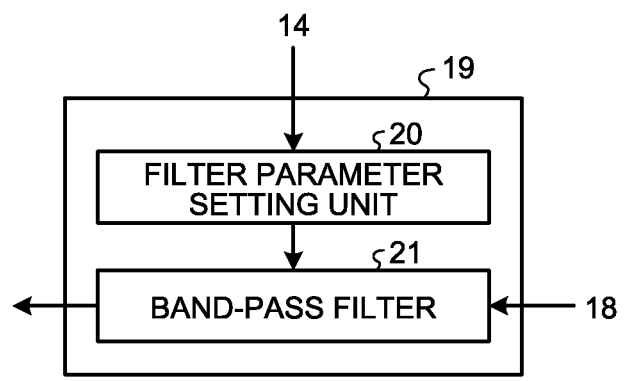
FIG. 7 is a block diagram illustrating an example of a functional configuration of a filtering unit according to the second embodiment.

FIG. 7 is a block diagram illustrating an example of a functional configuration of the filtering unit 19 according to the second embodiment. The filtering unit 19 includes a filter parameter setting unit 20 and a band-pass filter 21. The filter parameter setting unit 20 estimates the vibration frequency of vibration of a relative displacement from prediction model parameters acquired from the model parameter operation unit 14, and sets a passband centered on the vibration frequency in the band-pass filter 21.

Specifically, when a prediction model expressed by numerical formula (4) can be constructed from the prediction model parameters, the vibration frequency of the relative displacement can be easily estimated from numerical formulas (5) and (6). If prediction model parameters have not yet been determined before a machining operation, in order for the pre-filtering relative displacement to be used directly as an output of the relative displacement calculation unit 131 without making filtering, the filter parameter setting unit 20 also performs setting to enable or disable the use of the band-pass filter 21. The band-pass filter 21 performs filtering on the pre-filtering relative displacement outputted from the relative displacement operation unit 18, based on the setting of the filter parameter setting unit 20, to remove a component corresponding to noise from the displacement, and outputs it as a relative displacement. The relative displacement outputted by the band-pass filter 21 is set as a relative displacement generated by the relative displacement calculation unit 131.

When the vibration frequency of vibration of a relative displacement is known in advance, the filter parameter setting unit 20 may set the passband of the band-pass filter 21, regardless of the input of prediction model parameters from the model parameter operation unit 14. The manner of setting the passband in the band-pass filter 21 is not particularly limited, and it may be a manner of setting plus or minus some tens of Hz of a predicted frequency as a passband, a manner of additionally setting frequency ranges of half and twice a predicted frequency for a passband, or some such manner, in so far as the manner allows passage of a frequency of a value close to the frequency of vibration of the relative displacement.

According to the numerical control device 81 of the second embodiment, the model parameter operation unit 14 performs optimization processing on a relative displacement outputted from the filtering unit 19 after unnecessary vibration is removed as described above, so that accuracy in changing prediction model parameters is improved. As a result, suppression capability against vibration of the relative displacement can be further improved.

Third Embodiment

Figure 8:
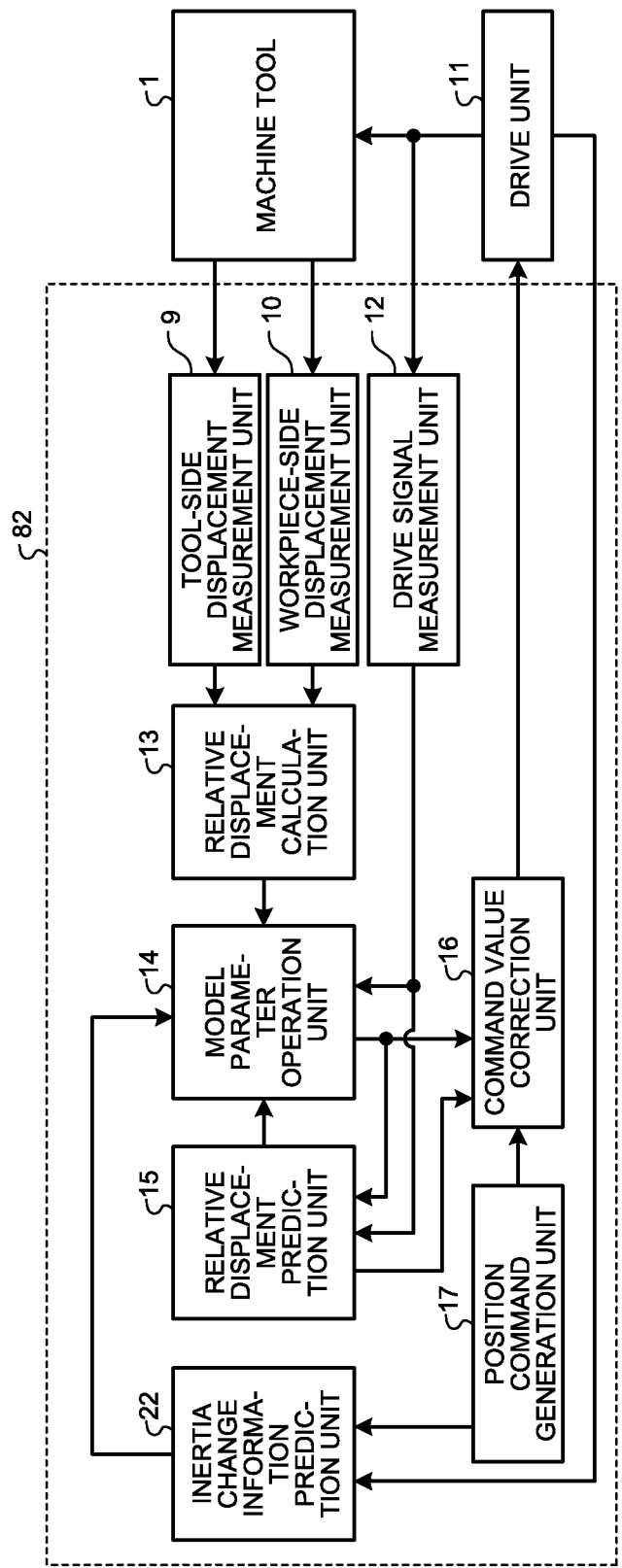
FIG. 8 is a block diagram illustrating an example of a functional configuration of a numerical control device according to a third embodiment of the present invention.

FIG. 8 is a block diagram illustrating an example of a functional configuration of a numerical control device 82 according to a third embodiment of the present invention. The numerical control device 82 is different from the numerical control device 8 according to the first embodiment in that the numerical control device 82 further includes an inertia change information prediction unit 22. Another difference from the first embodiment is that whether to enable or disable change processing on prediction model parameters in the model parameter operation unit 14 is determined based on inertia change information outputted from the inertia change information prediction unit 22.

The inertia change information prediction unit 22 acquires inertia information on the workpiece 3 outputted from the drive unit 11 or axis position information outputted from the position command generation unit 17, and outputs inertia change information indicating that a change has occurred in the inertia of the machine tool 1 to the model parameter operation unit 14.

The inertia information on the workpiece 3 is estimated inertia of the workpiece 3 placed on the table 4. As for the estimated inertia of the workpiece 3, it is known that the inertia of the workpiece 3 to be driven can be estimated based on a current that is a drive signal at the time of acceleration or deceleration of the motor and acceleration value. Therefore, the drive unit 11 outputs estimated inertia of the workpiece 3 placed on the table 4 based on a current as a drive signal at the time of acceleration or deceleration of the motor and acceleration value.

The position command generation unit 17 outputs a position command that is movement information on each drive axis of the machine tool 1 based on a machining program. Thus, the position command is outputted as axis position information.

The inertia change information prediction unit 22 stores acquired estimated inertia, and when determining that a change in the estimated inertia has become large, the inertia change information prediction unit 22 recognizes that the inertia of the machine tool 1 has changed and outputs inertia change information. A threshold value for the amount of change in the estimated inertia, which is required for the determination, is preset properly.

The inertia change information prediction unit 22 stores acquired axis position information, and when determining that the axis position information has changed greatly, the inertia change information prediction unit 22 recognizes that the inertia of the machine tool 1 has changed and outputs inertia change information. A threshold value for the amount of change in the position command, which is required for the determination, is preset properly.

Based on the inertia change information acquired from the inertia change information prediction unit 22, the model parameter operation unit 14 determines whether to enable or disable the prediction model parameter change processing. Specifically, when a workpiece 3 having a large weight is placed on the table 4, the inertia of the machine tool 1 changes greatly. Here, the inertia change information is binary information of on or off. The inertia change information prediction unit 22 detects that the inertia of the machine tool 1 has greatly changed, based on estimated inertia acquired from the drive unit 11 after acceleration or deceleration of the motor driving the table 4, and turns the inertia change information on and outputs it. Here, the inertia change information prediction unit 22 stores the acquired estimated inertia when it has detected the great change in the inertia of the machine tool 1. When the inertia change information is turned on, the model parameter operation unit 14 performs the prediction model parameter change processing. After the prediction model parameter change processing is performed, the inertia change information prediction unit 22 turns the inertia change information off.

The prediction model parameter change processing is processing required when the inertia of the machine tool 1 has greatly changed. According to the numerical control device 82 of the third embodiment, the change processing can be performed only when necessary to prevent unnecessary change of the prediction model parameters, so that unnecessary operation cost can be eliminated.

Fourth Embodiment

Figure 9:
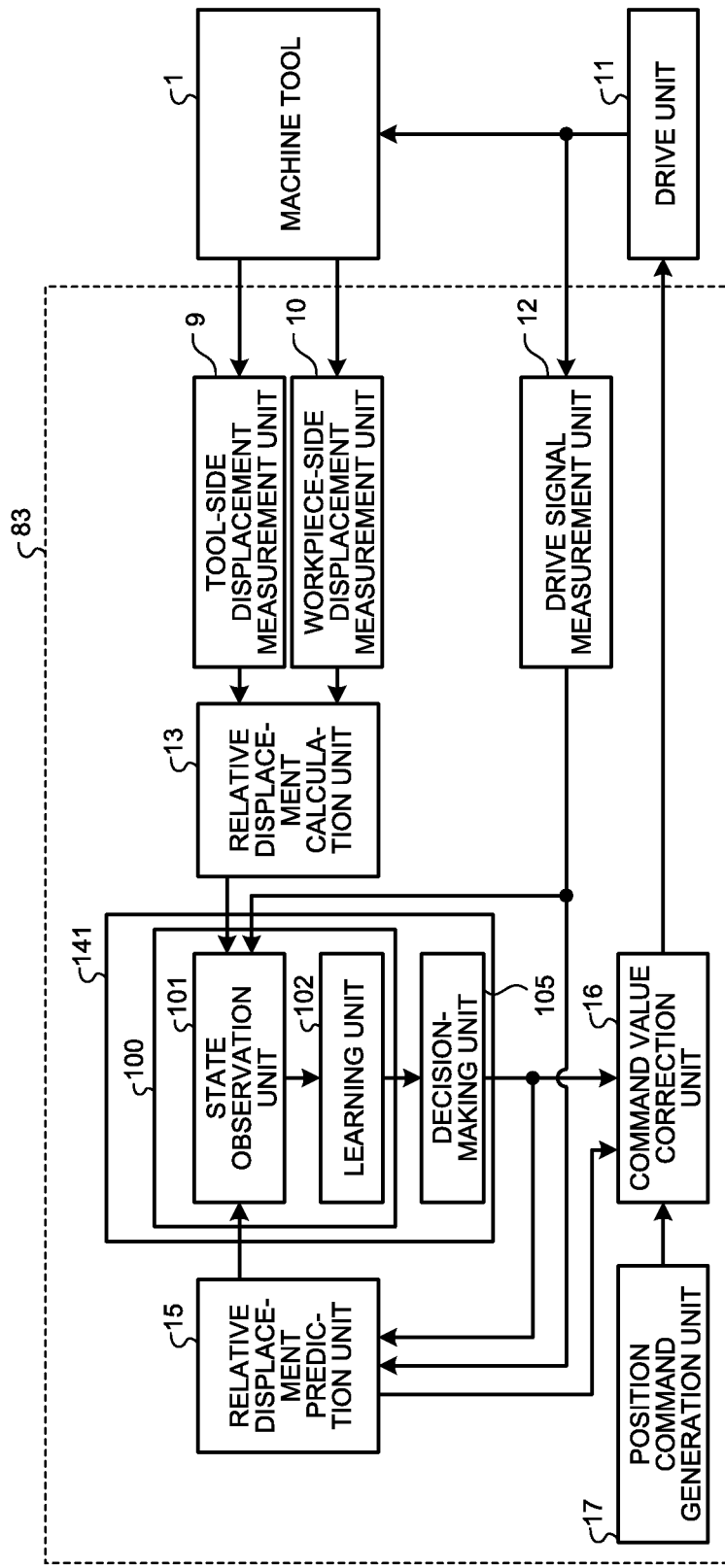
FIG. 9 is a block diagram illustrating an example of a functional configuration of a numerical control device according to a fourth embodiment of the present invention.

FIG. 9 is a block diagram illustrating an example of a functional configuration of a numerical control device 83 according to a fourth embodiment of the present invention. The numerical control device 83 is different from the numerical control device 8 according to the first embodiment in that the model parameter operation unit 14 is changed to a model parameter operation unit 141.

The model parameter operation unit 141 includes a machine learning device 100 that learns prediction model parameters and a decision-making unit 105. The machine learning device 100 includes a state observation unit 101 and a learning unit 102.

The state observation unit 101 observes a relative displacement acquired from the relative displacement calculation unit 13, a relative displacement predicted value acquired from the relative displacement prediction unit 15, and a drive signal acquired from the drive signal measurement unit 12 as state variables.

The learning unit 102 learns prediction model parameters according to a training data set that is produced based on the state variables of the relative displacement, the relative displacement predicted value, and the drive signal.

The learning unit 102 may use any learning algorithm. As an example thereof, a case where reinforcement learning is applied will be described. In the reinforcement learning, an agent (subject of an action) in a certain environment observes a current state and determines an action to take. The agent obtains a reward from the environment by selecting an action, and learns a policy to obtain the most reward through a series of actions. As typical methods of reinforcement learning, Q-learning and TD-learning are known. For example, in the case of Q learning, a typical update equation (action value table) of an action-value function Q(s,a) is expressed by numerical formula (7) below.

[Formula 7]

$$Q(s_t,a_t) \leftarrow Q(s_t,a_t) + \alpha^* r_{t+1} + \gamma \max_a Q(s_{t+1},a_t) - Q(s_t,a_t)) \quad (7)$$

In numerical formula (7), $s_t$ represents an environment at a time t, and $a_t$ represents an action at the time t. By the action $a_t$, the environment changes to $s_{t+1}$. $r_{t+1}$ represents a reward given by the environmental change, $\gamma$ represents a discount factor, and a represents a learning rate. When Q learning is applied, prediction model parameters constitute the action $a_t$.

In the update equation represented by numerical formula (7), if the action value of the best action "a" at the time t+1 is larger than the action value Q of the action "a" performed at the time t, the action value Q is increased. If not, the action value Q is reduced. In other words, the action-value function Q(s,a) is updated such that the action value Q of the action a at the time t approaches the best action value at the time t+1. Consequently, the best action value in a certain environment is sequentially propagated to an action value in a previous environment.

Figure 10:
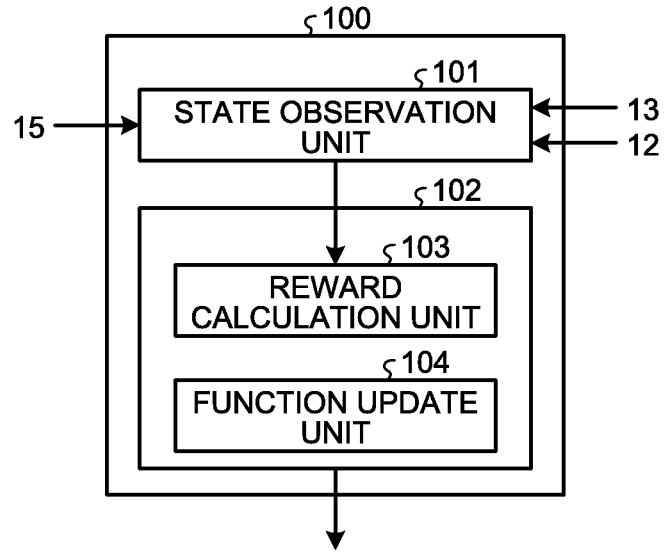
FIG. 10 is a block diagram illustrating an example of a functional configuration of a machine learning device according to the fourth embodiment.

FIG. 10 is a block diagram illustrating an example of a functional configuration of the machine learning device 100 according to the fourth embodiment. The learning unit 102 further includes a reward calculation unit 103 and a function update unit 104.

The reward calculation unit 103 calculates a reward based on state variables.

Here, the absolute value of a difference between a relative displacement predicted value outputted from the relative displacement prediction unit 15 and a relative displacement outputted from the relative displacement calculation unit 13 is a prediction error of relative displacement. The prediction error of relative displacement is extracted according to a publicly known method. Specifically, the prediction error of relative displacement can be determined by measuring the relative displacement and the relative displacement predicted value after acceleration or deceleration driving of the motor for an axis along which the table 4 with the workpiece 3 having a large weight mounted thereon is driven.

The reward calculation unit 103 calculates a reward r, based on the prediction error of relative displacement. More specifically, when the absolute value of the difference between the vibration frequency of the relative displacement predicted value and the frequency of the relative displacement decreases as a result of changing the prediction model parameters, the reward calculation unit 103 increases the reward r. To increase the reward r, a reward of "1" is given. The value of the reward is not limited to "1".

When the absolute value of the difference between the amplitude of the relative displacement predicted value and the amplitude of the relative displacement increases as a result of changing the prediction model parameters, the reward calculation unit 103 reduces the reward r. To reduce the reward r, a reward of "−1" is given. The value of the reward is not limited to "−1".

The function update unit 104 updates the function for determining the prediction model parameters, according to the reward calculated by the reward calculation unit 103. The update of the function can be performed according to the training data set, specifically by updating the action value table. The action value table is a data set in which any given actions and their respective action values are associated and stored in the form of a table. For example, in the case of Q-learning, the action-value function $Q(s_t, a_t)$ expressed by numerical formula (7) is used as the function for the prediction model parameters.

Figure 11:
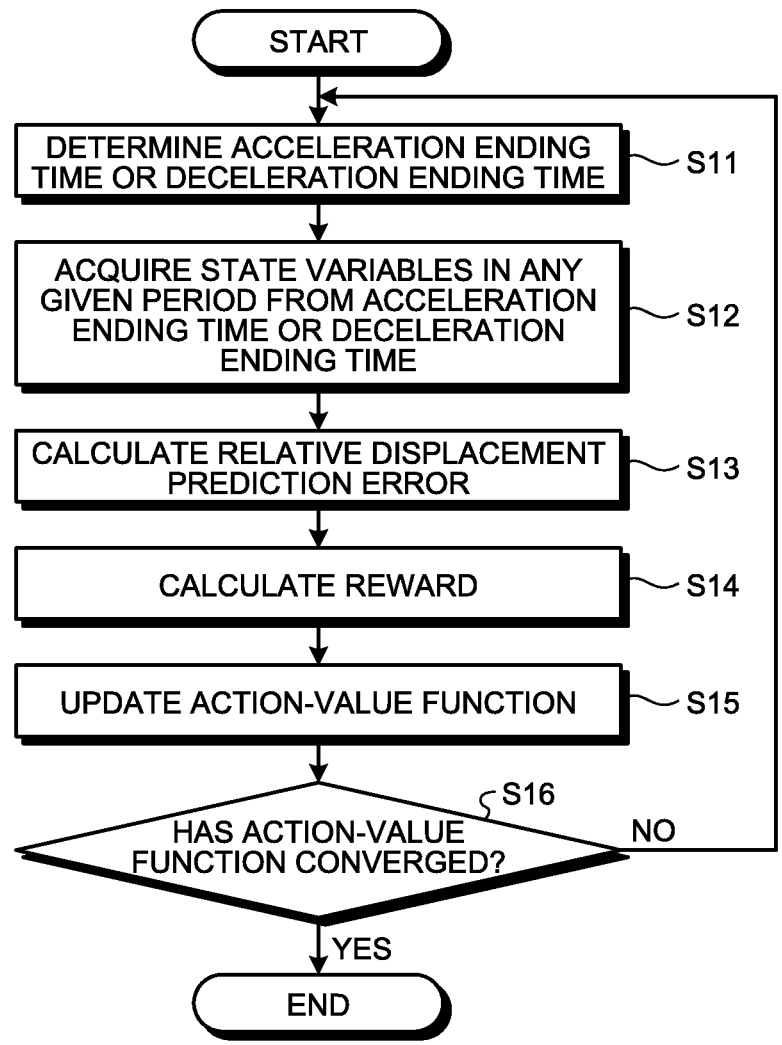
FIG. 11 is a flowchart illustrating an operation flow of the machine learning device using reinforcement learning according to the fourth embodiment.

FIG. 11 is a flowchart illustrating an operation flow of the machine learning device 100 using reinforcement learning according to the fourth embodiment. With reference to the flowchart of FIG. 11, a reinforcement learning method for updating the action-value function $Q(s,a)$ will be described.

First, the state observation unit 101 determines an acceleration ending time or a deceleration ending time, based on a drive signal acquired from the drive signal measurement unit 12 (step S11).

The state observation unit 101 acquires state variables in any given period from the acceleration ending time or the deceleration ending time (step S12). The state variables include a relative displacement, a drive signal, and a relative displacement predicted value. Since the motor is driven after completion of acceleration, the relative displacement may contain unnecessary noise. It is thus desirable to use a relative displacement in a stopped state after completion of deceleration as a state variable.

The reward calculation unit 103 calculates a prediction error of relative displacement that is the absolute value of a difference between the relative displacement predicted value and the relative displacement (step S13).

The reward calculation unit 103 calculates a reward r, based on the prediction error of relative displacement (step S14).

According to the reward r determined in step S14, the function update unit 104 updates the action-value function $Q(s,a)$ according to numerical formula (7) (step S15).

The function update unit 104 determines whether updating is no longer performed in step S15 and the action-value function Q has converged (step S16). When it is determined that the action-value function Q has not converged (step S16: No), the process returns to step S11. When it is determined that the action-value function Q has converged (step S16: Yes), learning by the learning unit 102 is ended. Learning may be continued by returning from step S15 immediately to step S11 without providing step S16.

The decision-making unit 105 selects prediction model parameters to obtain the most reward based on the results of learning of the learning unit 102, that is, the updated action-value function $Q(s,a)$. By acquiring the prediction model parameters from the decision-making unit 105 and correcting a position command, the command value correction unit 16 can suppress vibration generated in a relative displacement in accordance with a change in the inertia of the machine tool 1.

The fourth embodiment has described the case where the learning unit 102 performs machine learning using reinforcement learning. However, the learning unit 102 may perform machine learning according to another publicly known method, a learning algorithm such as a neural network, genetic programming, functional logic programming, or a support vector machine.

Figure 12:
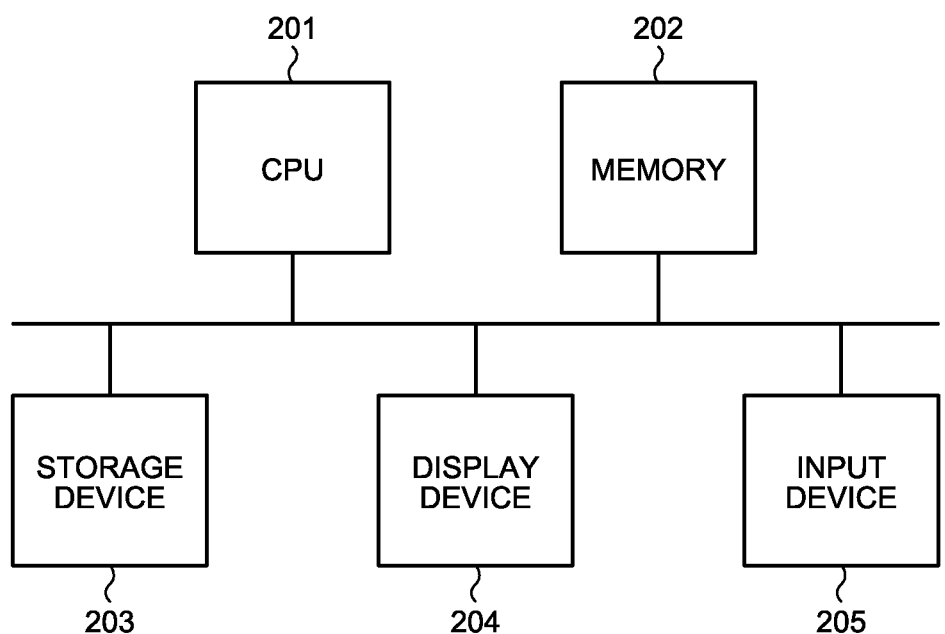
FIG. 12 is a diagram illustrating a hardware configuration when the functions of the numerical control device according to the first to fourth embodiments are implemented by a computer system.

The numerical control devices 8 and 81 to 83 according to the first to fourth embodiments are implemented by a computer system such as a personal computer or a general-purpose computer. FIG. 12 is a diagram illustrating a hardware configuration when the functions of the numerical control devices 8 and 81 to 83 according to the first to fourth embodiments are implemented by a computer system. When the functions of the numerical control devices 8 and 81 to 83 are implemented by a computer system, the functions of the numerical control devices 8 and 81 to 83 are implemented by a central processing unit (CPU) 201, a memory 202, a storage device 203, a display device 204, and an input device 205, as illustrated in FIG. 12. The functions executed by the machine learning device 100 are implemented by software, firmware, or a combination of software and firmware. Software or firmware is written as programs and stored in the storage device 203. The CPU 201 reads the software or firmware stored in the storage device 203 into the memory 202 and executes it, thereby implementing the functions of the numerical control devices 8 and 81 to 83. That is, the computer system includes the storage device 203 for storing programs that will be consequently subjected to the execution of the steps to perform the operations of the numerical control devices 8 and 81 to 83 according to the first to fourth embodiments when the functions of the numerical control devices 8 and 81 to 83 are to be executed by the CPU 201. It can also be said that these programs cause the computer to execute the processing realized by the functions of the numerical control devices 8 and 81 to 83. The memory 202 corresponds to a volatile storage area such as a random access memory (RAM). The storage device 203 corresponds to a nonvolatile or volatile semiconductor memory such as a read-only memory (ROM) or a flash memory, or a magnetic disk. Specific examples of the display device 204 are a monitor and a display. Specific examples of the input device 205 are a keyboard, a mouse, and a touch panel.

The configurations described in the above embodiments illustrate an example of the subject matter of the present invention, and can be combined with other publicly known arts and can be partly omitted and/or modified without departing from the scope of the present invention.

REFERENCE SIGNS LIST

1 machine tool; 2 bed; 3 workpiece; 4 table; 5 tool; 6 head; 7 column; 8, 81 to 83 numerical control device; 9 tool-side displacement measurement unit; 10 workpiece-side displacement measurement unit; 11 drive unit; 12 drive signal measurement unit; 13, 131 relative displacement calculation unit; 14, 141 model parameter operation unit; 15 relative displacement prediction unit; command value correction unit; 17 position command generation unit; 18 relative displacement operation unit; filtering unit; 20 filter parameter setting unit; 21 band-pass filter; 22 inertia change information prediction unit; 100 machine learning device; 101 state observation unit; 102 learning unit; 103 reward calculation unit; 104 function update unit; 105 decision-making unit; 201 CPU; 202 memory; 203 storage device; 204 display device; 205 input device.

The invention claimed is:

1. A numerical control device for controlling a relative displacement between a tool and a workpiece in a machine tool using a command to drive circuitry driving a motor, the numerical control device comprising:
tool-side displacement measurement circuitry to measure a physical quantity related to a displacement of the tool;
workpiece-side displacement measurement circuitry to measure a physical quantity related to a displacement of the workpiece;
drive signal measurement circuitry to measure a drive signal outputted from the drive circuitry to the motor;
relative displacement calculation circuitry to calculate a relative displacement between the tool and the workpiece from the physical quantity related to the displacement of the tool and the physical quantity related to the displacement of the workpiece;
relative displacement prediction circuitry to calculate a relative displacement predicted value that is a predicted value of the relative displacement from the drive signal, based on a prediction model representing a relationship between the drive signal and the relative displacement;
model parameter operation circuitry to generate prediction model parameters constituting the prediction model, based on the drive signal, the relative displacement generated by the relative displacement calculation circuitry, and the relative displacement predicted value; and
command value correction circuitry to output as the command a post-correction position command obtained by correcting a position command to the drive circuitry using the prediction model parameters,
wherein the model parameter operation circuitry changes the prediction model parameters to reduce a difference between the relative displacement generated by the relative displacement calculation circuitry and the relative displacement predicted value.

2. The numerical control device according to claim 1, wherein the model parameter operation circuitry changes the prediction model parameters so that a vibration frequency, an amplitude, a damping ratio, and a phase of vibration of the relative displacement predicted value correspond to a vibration frequency, an amplitude, a damping ratio, and a phase of vibration of the relative displacement generated by the relative displacement calculation circuitry, respectively.

3. The numerical control device according to claim 2, wherein the relative displacement calculation circuitry determines a pre-filtering relative displacement between the tool and the workpiece from the physical quantity related to the displacement of the tool and the physical quantity related to the displacement of the workpiece, and performs filtering on the pre-filtering relative displacement using the prediction model parameters to calculate a relative displacement.

4. The numerical control device according to claim 3, further comprising:
inertia information change prediction circuitry to output inertia change information indicating that a change has occurred in inertia of the machine tool,
wherein the model parameter operation circuitry changes the prediction model parameters, based on the inertia change information.

5. The numerical control device according to claim 4, wherein
the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

6. The numerical control device according to claim 3, wherein
the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

7. The numerical control device according to claim 2, further comprising:
inertia information change prediction circuitry to output inertia change information indicating that a change has occurred in inertia of the machine tool,
wherein the model parameter operation circuitry changes the prediction model parameters, based on the inertia change information.

8. The numerical control device according to claim 7, wherein
the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

9. The numerical control device according to claim 2, wherein
the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and learning circuitry to learn the prediction model parameters according to a training data set produced based on the state variables.

10. The numerical control device according to claim 1, wherein the relative displacement calculation circuitry determines a pre-filtering relative displacement between the tool and the workpiece from the physical quantity related to the displacement of the tool and the physical quantity related to the displacement of the workpiece, and performs filtering on the pre-filtering relative displacement using the prediction model parameters to calculate a relative displacement.

11. The numerical control device according to claim 10, further comprising:

inertia information change prediction circuitry to output inertia change information indicating that a change has occurred in inertia of the machine tool, wherein the model parameter operation circuitry changes the prediction model parameters, based on the inertia change information.

12. The numerical control device according to claim 11, wherein the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

13. The numerical control device according to claim 10, wherein the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

14. The numerical control device according to claim 1, further comprising:

inertia information change prediction circuitry to output inertia change information indicating that a change has occurred in inertia of the machine tool, wherein the model parameter operation circuitry changes the prediction model parameters, based on the inertia change information.

15. The numerical control device according to claim 14, wherein the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

16. The numerical control device according to claim 1, wherein the model parameter operation circuitry comprises:
machine learning circuitry to learn the prediction model parameters; and
decision-making circuitry to determine the prediction model parameters, based on a result of learning of the machine learning circuitry, and
the machine learning circuitry comprises:
state observation circuitry to observe the drive signal, the relative displacement generated by the relative displacement calculation circuitry, and the relative displacement predicted value as state variables; and
learning circuitry to learn the prediction model parameters according to a training data set produced based on the state variables.

* * * * *